(12) United States Patent
Shinoda et al.

(10) Patent No.: US 8,406,514 B2
(45) Date of Patent: Mar. 26, 2013

(54) IMAGE PROCESSING DEVICE AND RECORDING MEDIUM STORING IMAGE PROCESSING PROGRAM

(75) Inventors: Tomotaka Shinoda, Tokyo (JP); Toshihiro Mitaka, Sapporo (JP); Satoshi Mori, Sapporo (JP); Naoki Watanabe, Sapporo (JP); Hideki Ito, Sapporo (JP)

(73) Assignees: Nikon Corporation, Tokyo (JP); Sapporo Medical University, Hokkaido (JP)

( * ) Notice: Subject to any disclaimer, the term of this patent is extended or adjusted under 35 U.S.C. 154(b) by 1075 days.

(21) Appl. No.: 12/339,925

(22) Filed: Dec. 19, 2008

(65) Prior Publication Data

US 2009/0141979 A1 Jun. 4, 2009

Related U.S. Application Data

(63) Continuation-in-part of application No. 12/280,520, filed on Aug. 22, 2008.

(30) Foreign Application Priority Data

Jul. 10, 2006 (JP) .................................. 2006-189607
Dec. 20, 2007 (JP) .................................. 2007-328940

(51) Int. Cl.
*G06K 9/00* (2006.01)

(52) U.S. Cl. ..................................................... 382/162

(58) Field of Classification Search ........................ None
See application file for complete search history.

(56) References Cited

U.S. PATENT DOCUMENTS

| | | | |
|---|---|---|---|
| 4,488,245 A | 12/1984 | Dalke et al. | |
| 5,719,639 A * | 2/1998 | Imamura | 348/577 |
| 5,930,009 A * | 7/1999 | Sato et al. | 358/518 |
| 5,940,530 A * | 8/1999 | Fukushima et al. | 382/164 |
| 6,462,835 B1 * | 10/2002 | Loushin et al. | 358/1.9 |
| 7,283,858 B2 * | 10/2007 | Sendai | 600/407 |
| 7,394,931 B2 * | 7/2008 | Shimizu | 382/168 |
| 7,542,166 B2 * | 6/2009 | Kim et al. | 358/1.9 |

(Continued)

FOREIGN PATENT DOCUMENTS

| | | |
|---|---|---|
| EP | 1 720 361 A | 11/2006 |
| JP | 64-12381 A | 1/1989 |

(Continued)

OTHER PUBLICATIONS

Cheng H D et al: "Color image segmentation: advances and prospects" Pattern Recognition, Elsevier, GB, vol. 34, No. 12, Dec. 1, 2001, pp. 2259-2281.

(Continued)

*Primary Examiner* — Samir Ahmed
(74) *Attorney, Agent, or Firm* — Arent Fox LLP

(57) ABSTRACT

An inspection apparatus includes an imaging device and an image processing device. The imaging device photographs a specimen and outputs a color image of the specimen to the image processing device. The image processing device subjects the color image of the specimen to negative-positive reversal. After detecting a mode value of the hue the color image having been subjected to negative-positive reversal, the image processing device changes the hue of the color image in accordance with a difference between a boundary value of two predefined hues and the detected mode value. In accordance with the change of the hue, a plurality of target pixels different in the saturation is extracted and the saturation and the intensity of each pixel are changed, or the gradation of each pixel is converted so that the plurality of target pixels becomes most distant from one another in a color space.

12 Claims, 14 Drawing Sheets

U.S. PATENT DOCUMENTS

| | | | |
|---|---|---|---|
| 7,613,335 B2 * | 11/2009 | McLennan et al. | 382/128 |
| 8,023,164 B2 * | 9/2011 | Ogawa | 358/518 |
| 2002/0063801 A1 * | 5/2002 | Richardson | 348/589 |
| 2003/0007687 A1 | 1/2003 | Nesterov et al. | |
| 2003/0012433 A1 | 1/2003 | Gruzdev et al. | |
| 2003/0142865 A1 * | 7/2003 | Hirota et al. | 382/167 |
| 2004/0057617 A1 * | 3/2004 | Miyawaki et al. | 382/167 |
| 2004/0165771 A1 | 8/2004 | Russell et al. | |
| 2004/0240731 A1 * | 12/2004 | Kim et al. | 382/162 |
| 2005/0036668 A1 * | 2/2005 | McLennan et al. | 382/128 |
| 2005/0100212 A1 * | 5/2005 | Eguchi et al. | 382/164 |
| 2006/0176400 A1 * | 8/2006 | Shimizu | 348/570 |
| 2006/0204071 A1 * | 9/2006 | Ortyn et al. | 382/133 |
| 2007/0115392 A1 * | 5/2007 | Masuda et al. | 348/678 |
| 2010/0156921 A1 * | 6/2010 | McLennan et al. | 345/589 |

FOREIGN PATENT DOCUMENTS

| | | | |
|---|---|---|---|
| JP | 3-127284 A | 5/1991 | |
| JP | 4-248681 A | 9/1992 | |
| JP | 5-174142 A | 7/1993 | |
| JP | 10-302069 A | 11/1998 | |
| JP | 2002-271808 A | 9/2002 | |

OTHER PUBLICATIONS

Fleyeh H: "Color Detection and segmentation for road and traffic signs" Cybernetics and Intelligent Systems, 2004 IEEE Conference on Singapore Dec. 1-3, 2004, Piscataway, NJ, USA, IEEE, US, vol. 2, pp. 809-814.

Oueisser A Ed—Institute of Electrical and Electronics Engineers: "Color Spaces for Inspection of Natural Objects" Proceedings of the International Conference on Image Processing. ICIP 1997. Santa Barbara, CA, Oct. 26-29, 1997; Los Alamitos, CA: IEEE, US, pp. 42-45.

Yuh-Hwan Liu et al., "The Color Normalization Based on the Hue Histogram Warping for the Segmentation of Renal Biopsy", Chia-Nan Annual Bulletin, 2004, pp. 33-41, vol. 30.

I. Mackie et al., "A Simple Solution to a "Blinding" Problem", The Journal of Histochemistry and Cytochemistry, 2002, pp. 1139, vol. 50, No. 8.

G. Landini et al., Digital Enhancement of Haematoxylin- and Eosin-stained Histological Images for Red-green Colour-Blind Observes, Journal of Microscopy, Mar. 2, 2009, pp. 293-301, vol. 234, No. 3.

Alan R. Gillespie et al., "Color Enhancement of Highly Correlated Images I. Decorrelation and HSI Contrast Stretches", Remote Sensing of Environment, 1986, pp. 209-235, vol. 20.

Petya Em.Pavlova et al., "Application of HSV Colour System in Identification by Colour of Biological Objects on the Basis of Microscopic Images", Computerized Medical Imaging and Graphics, 1996, pp. 357-364, vol. 20, No. 5.

Christopher M. Bishop, "Neural Networks for Pattern Recognition", Institute for Adaptive and Neural Computation Division of Informatics Edinburgh University, 1995, Oxford University Press Inc., New York.

* cited by examiner

IMAGE PROCESSING DEVICE AND RECORDING MEDIUM STORING IMAGE PROCESSING PROGRAM

CROSS-REFERENCE TO RELATED APPLICATION

This application is a continuation-in-part application of U.S. patent application Ser. No. 12/280,520, filed Aug. 22, 2008, and claims the benefit of priority from Japanese Patent Application No. 2006-189607, filed on Jul. 10, 2006 and No. 2007-328940, filed on Dec. 20, 2007, the entire contents of which are incorporated herein by reference.

BACKGROUND

1. Field

The present application relates to an image processing device and a recording medium that stores an image processing program that processes a color image.

2. Description of the Related Art

In order to accurately diagnose various diseases of animals including humans, diagnoses of pathological tissues and cells are indispensable. Among others, information about kinds, numbers and shapes of cells included in blood and bone marrow is indispensable in many diagnoses of diseases, and therefore, cells are collected from blood and bone marrow and specimens are obtained and then a technical expert observes differences in shapes and color tones of the cells using a microscope and judges the kinds and anomalies of individual cells. Such tasks (in which a technical expert directly looks into a microscope and makes a judgment manually based on his/her own experience) are carried out routinely in an inspection room of hospitals all over the world.

For example, the measurement of the number of eosinophils in blood gives critical information for diagnoses of allergic diseases. The number of eosinophils has increased in blood of patients of pollinosis and asthma. For the diagnoses, blood is collected from a patient and the blood is smeared and fixed onto a slide glass, and then a technical expert observes the Giemsa-stained specimen by using a microscope with a magnification of 1,000 (liquid immersion). Then, the technical expert diagnoses based on the existence of eosinophilics (reference: "Kensa To Gijutsu (Inspection and Technique)", extra number, vol. 28, No. 7, 2000, IGAKU-SHOIN Ltd., "Standard Kensa ketsueki-Gaku (Standard Laboratory Hematology)", compiled by The Japanese Society for Laboratory Hematology, Ishiyaku Publishers, Inc., 2003, 1st edition).

On the other hand, thanks to the recent development of digital technologies, each element of a microscopic image is converted into digital information and it is made possible not only to directly project an image on a screen but also to process the image in a variety of ways using software. If the task of judgment based on the experience of a technical expert is generalized into a method by which any one can make a distinction, it is made possible to considerably reduce the time and costs for the task.

In such circumstances, a color image of a stained specimen is taken in and pathological diagnoses of the specimen are made based on the image. It is normal to identify the kinds of individual cells based on the differences in forms of specimen images that appear in the image (for example, refer to non-patent document 1: Clinical & Laboratory Haematology, 2003, vol. 25, pp. 139-147, "Differential counting of blood leukocytes using automated microscopy and a decision support system based on artificial neural networks—evaluation of DiffMaster Octavia"). Instead of the diagnosis based on the differences in forms of specimen images, it is also proposed to identify the kinds of individual cells by plotting the values of each pixel of a color image of specimen in a predetermined color space and distinguishing the color differences for each kind of cell based on the sub-volume occupied by the values of each pixel in the color space (for example, refer to patent document 1: Japanese Unexamined Patent Application Publication No. 2003-506796).

The method, in which color difference for each kind of cells is distinguished based on the sub-volume in the color space, is however an indirect method. Recently, it is desired to directly distinguish the color difference for each kind of cells in a color image (real image) of specimen and make a diagnosis based on the color difference. However, the color difference for each kind of cells in a real image is extremely small and it is not possible to explicitly distinguish the color difference on the real image.

SUMMARY

A proposition of the invention is to provide an image processing device and a recording medium that stores an image processing program capable of clarifying a slight color difference in a color image (real image) of specimen.

According to an aspect of the invention, an image processing device includes a processing unit that finds color information including hue or saturation of each pixel of a color image and a changing unit that changes color information of each pixel by changing at least one of the hue and the saturation, that is, the color information.

In another aspect of the invention, an image processing device includes a detecting unit that detects a mode value of the hue when the processing unit finds the hue of each pixel of the color image as the color information be provided, wherein the changing unit changes the hue of each pixel of the color image in accordance with the difference between a boundary value of two predefined hues and the mode value.

In another aspect of the invention, the processing unit finds saturation and intensity of each pixel, in addition to the hue, and the changing unit also changes the saturation and the intensity, in addition to the change of the hue and changes the saturation and the intensity of each pixel of the color image so that a plurality of target pixels different in the saturation becomes most distant from one another in a color space having a hue axis, a saturation axis and an intensity axis.

In another aspect of the invention, the image processing device includes a converting unit which finds each color component of red, green and blue of each pixel of the color image based on the hue, the saturation and the intensity after the change by the changing unit and converts a gradation of the each color component so that the plurality of target pixels becomes most distant from one another in the color space.

In another aspect of the invention, the processing unit finds saturation and intensity of each pixel, in addition to the hue, and the device further includes a converting unit which finds each color component of red, green and blue of each pixel in the color image based on the hue after the change by the changing unit and the saturation and the intensity found by the processing unit and converts a gradation of the each color component so that a plurality of target pixels different in the saturation becomes most distant from one another in a color space having a hue axis, a saturation axis and an intensity axis.

Also, the converting unit may convert the gradation of each color component using a table.

In another aspect of the invention, the image processing device includes an extracting unit that extracts the plurality of the target pixels based on a user instruction.

In another aspect of the invention, the image processing device includes a selecting unit that selects a target area of a predefined hue value of the color image.

Also, the selecting unit may select the target area based on a user instruction.

In another aspect of the invention, the image processing device includes a measuring unit that measures the number or area ratio of the target areas in the color image.

In another aspect of the invention, the changing unit changes the color information of each pixel by shifting the saturation of each pixel of the color image by a predetermined amount when the processing unit finds the saturation as the color information by the processing init.

In another aspect of the invention, the processing unit acquires hue and intensity as the color information from each pixel of the color image, in addition to the saturation, and the changing unit shifts the intensity of each pixel so that the center of a hue distribution, which is obtained by plotting the hue, the saturation, and the intensity of each of the pixels in a color space coordinate system having a hue axis, a saturation axis, and an intensity axis, moves toward the intensity axis.

In another aspect of the invention, a detecting unit detects a mode value of the hue of each pixel shifted by the changing unit by a predetermined amount, and a converting unit converts the color information of each pixel by changing the hue of each pixel of the color image in accordance with a difference between a boundary value of the two predefined hues and the mode value be provided.

Also, the processing unit may find at least the hue of each pixel using the color image after having been subjected to negative-positive reversal.

Also, the color image may be a photographed image of eosinophil.

According to another aspect of the invention, a recording medium stores an image processing program that causes a computer to execute a processing operation of finding color information including hue or saturation of each pixel of a color image, and a changing operation of changing the color information of each pixel by changing at least one of the hue and the saturation found in the processing operation.

In another aspect of the invention, the image processing program further includes a detecting operation of detecting the mode value of the hue when the hue of each pixel of the color image is found as the color information in the processing operation, and the changing operation changes the hue of each pixel of the color image in accordance with a difference between a boundary value of two predefined hues and the mode value.

In another aspect of the invention, the image processing program changes the color information of each pixel by shifting the saturation of each pixel of the color image by a predetermined amount when the saturation is found as the color information in the processing operation.

DETAILED DESCRIPTION OF THE EMBODIMENTS

Description of First Embodiment

Figure 1A:
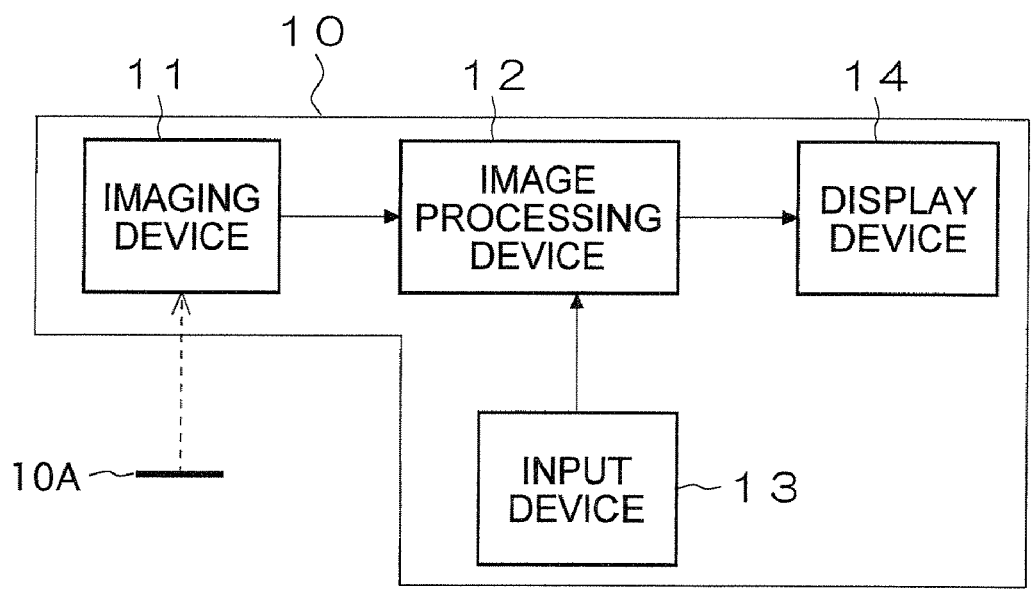
FIG. 1A is a block diagram for illustrating a configuration of an inspection apparatus 10 and FIG. 1B is a diagram showing an example of a specimen 10A.
Figure 1B:
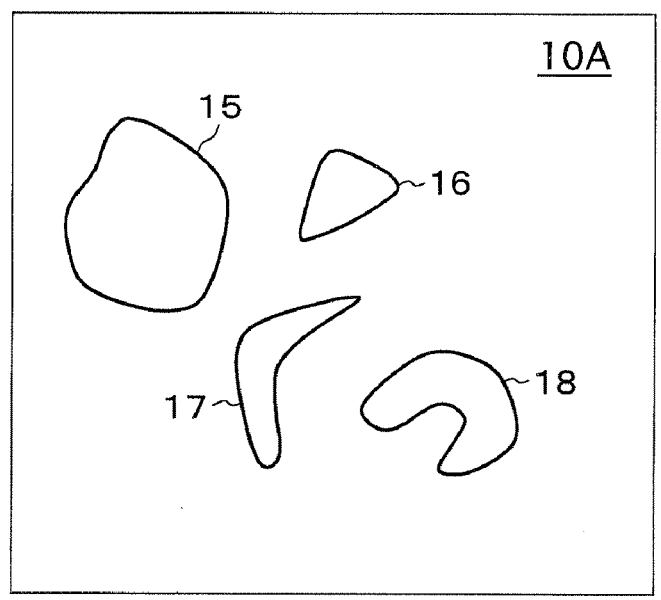

FIG. 1A is a block diagram showing a configuration of an inspection apparatus 10 in a first embodiment and FIG. 1B is an explanatory diagram showing, for example, a specimen of Giemsa-stained blood. The inspection apparatus 10 is used for pathological diagnosis of a specimen 10A. The specimen 10A is, for example, a specimen of Giemsa-stained blood, including a plurality of cells 15 to 18.

The inspection apparatus 10 is provided with an imaging device 11, such as a digital camera, an image processing device 12, an input device 13, and a display device 14. In the inspection apparatus 10, the imaging device 11 photographs the specimen 10A and outputs a color image (RGB image) of the specimen 10A to the image processing device 12.

Figure 2:
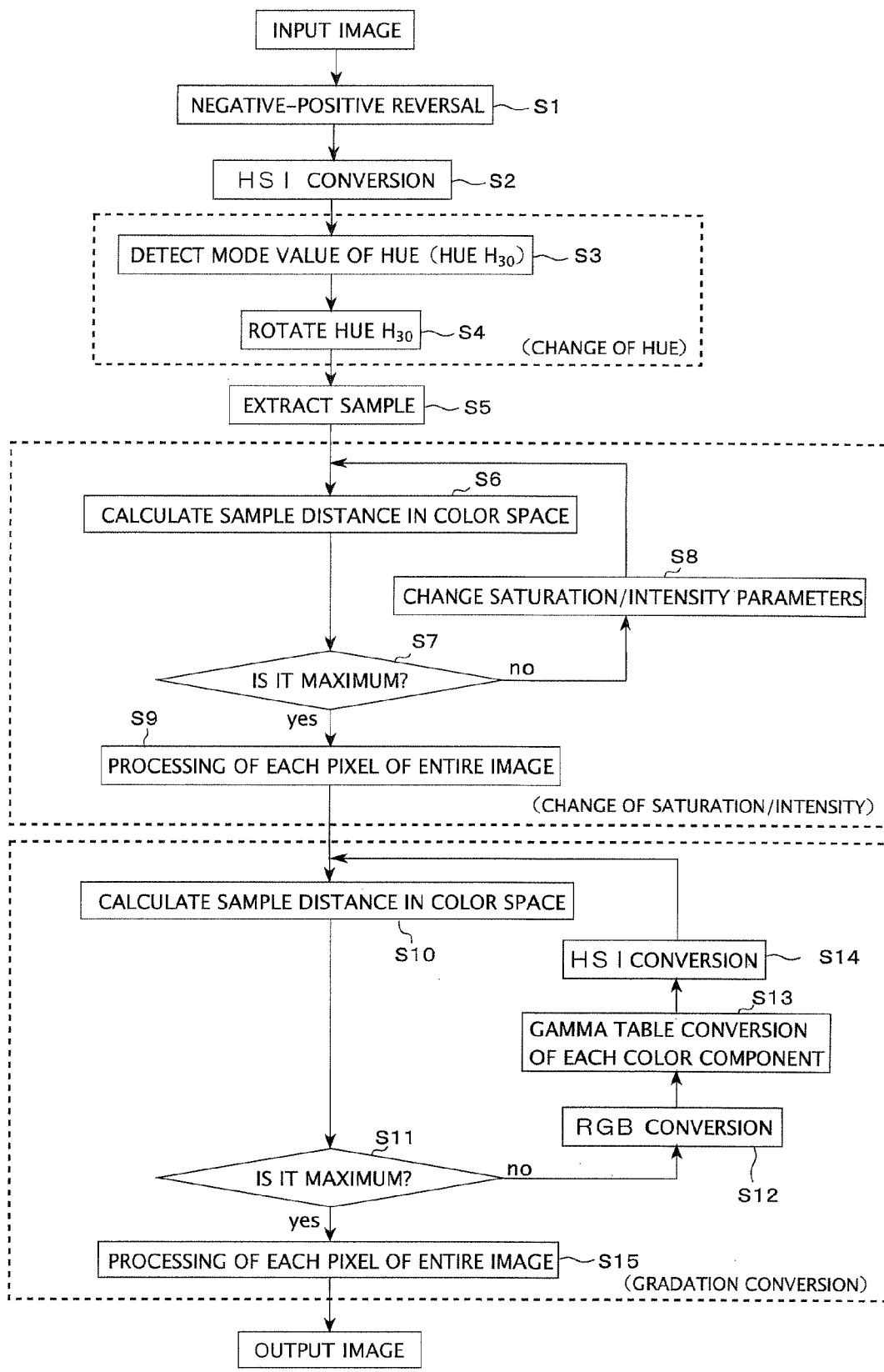
FIG. 2 is a flowchart showing a processing operation of a color image in an image processing device 12 in a first embodiment.

The image processing device 12 takes in the color image of the specimen 10A and processes the color image in accordance with the procedure of the flowchart shown in FIG. 2. In processing, a user instruction from the input device 13 is referred to as the need arises. In addition, the color image during or after processing is output to the display device 14 as the need arises.

The image processing device 12 is a computer in which an image processing program (FIG. 2) is installed. To install the image processing program, it is recommended to use a recording medium (CD-ROM etc.) in which the image processing program is recorded. Alternatively, it may also be possible to use carrier waves (including the image processing program) that can be downloaded via the Internet.

Figure 3:
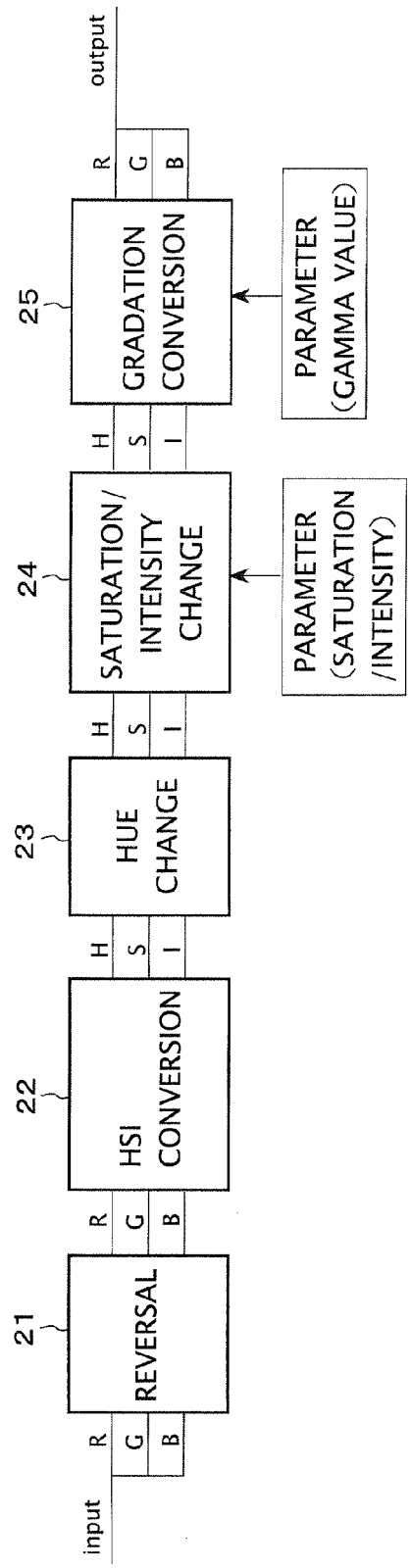
FIG. 3 is a diagram showing an example of a data path when processing a color image in the first embodiment.

Next, the specific content of the processing (FIG. 2) in the image processing device 12 of the present embodiment will be described. The object of the processing is the color image (RGB image) of the specimen 10A. An example of the data path when processing the color image is shown in FIG. 3 (blocks 21 to 25).

After taking in the color image of the specimen 10A, the image processing device 12 subjects it to negative-positive reversal (step S1, block 21). In the color image before the reversal, the purple cells 15 to 18 are distributed in the white background and in the color image after the reversal, the green cells 15 to 18 are distributed in the black background. Because each image is a real image, the color difference for each kind of cell is extremely slight.

Figure 4:
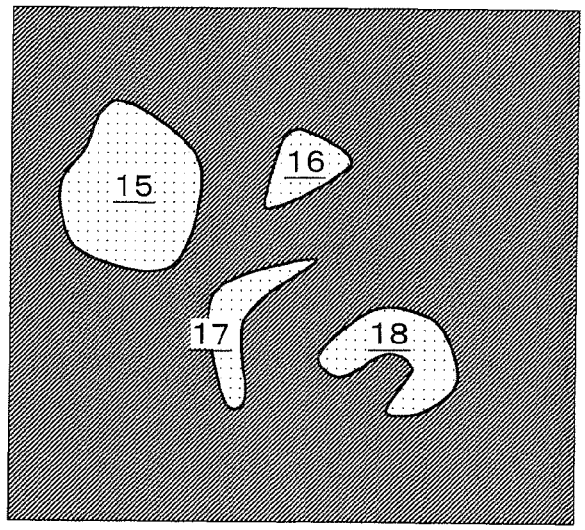
FIG. 4 is a schematic diagram of a color image after having been subjected to negative-positive reversal.

Because of this, it is difficult to explicitly distinguish the color difference for each kind of cell on the real image. The schematic diagram of the color image after the negative-positive reversal is shown in FIG. 4. In FIG. 4, to show that the color difference of each kind of cell is extremely slight, the cells 15 to 18 are hatched in the same way. The image processing device 12 in the present embodiment carries out the following processing to clarify the slight color difference in the real image.

In step S2 (block 22), the color image after the negative-positive reversal is subjected to HSI conversion. That is, the hue (H), the saturation (S), and the intensity (I) of each pixel are found based on each color component of red, green and blue (RGB) of each pixel of the color image.

Figure 5:
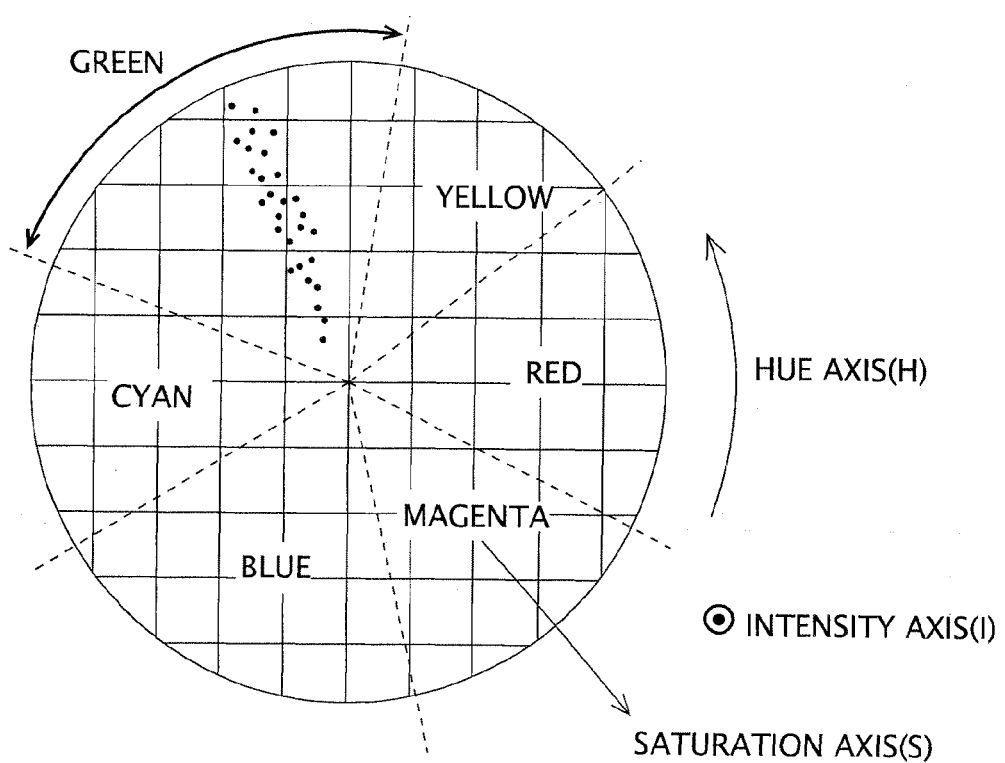
FIG. 5 is an explanatory diagram in which the values (hue/saturation/intensity) of each pixel after having been subjected to HSI conversion are plotted in a predetermined color space.

The values (hue/saturation/intensity) of each pixel after the HSI conversion are plotted in a predetermined color space as, for example, "•" in FIG. 5. In the color space in FIG. 5, the circumferential direction in the plane of the paper denotes the hue axis (H), the radial direction denotes the saturation axis (S), and the direction perpendicular to the plane of the paper denotes the intensity axis (I). It can be seen that the plot positions of the values (hue/saturation/intensity) of each pixel are distributed near the center in the direction of the hue axis (H) in the green area.

Figure 6:
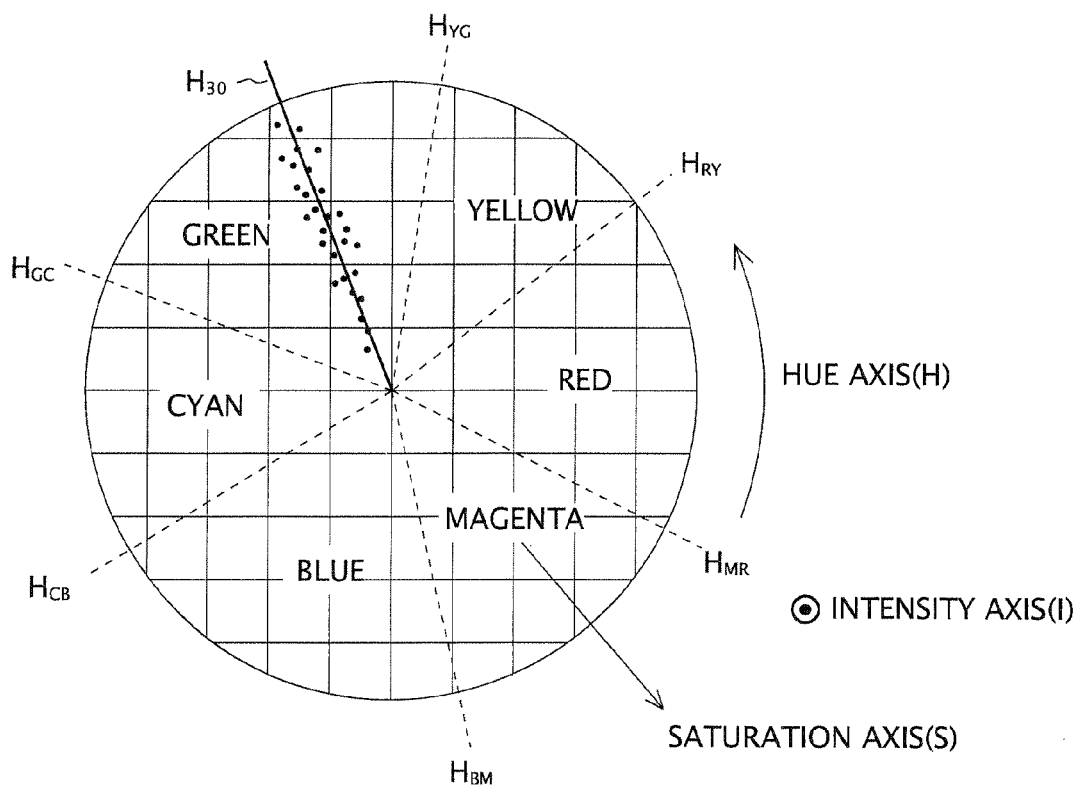
FIG. 6 is a diagram for illustrating a mode value (hue $H_{30}$) of the hue of each pixel.

In the next steps S3, S4 (block 23), the hue of each pixel is changed. That is, after the mode value of the hue of each pixel (hue $H_{30}$ in FIG. 6) is detected, the hue $H_{30}$ is rotated (FIG. 7) so that the hue $H_{30}$ overlaps one of color boundaries (for example, any one of color boundaries $H_{RY}$, $H_{YG}$, $H_{GC}$, $H_{CB}$, $H_{BM}$ and $H_{MR}$) and thus the hue of each pixel of the entire image is changed. A color boundary is a boundary value between two predefined hues.

Figure 7:
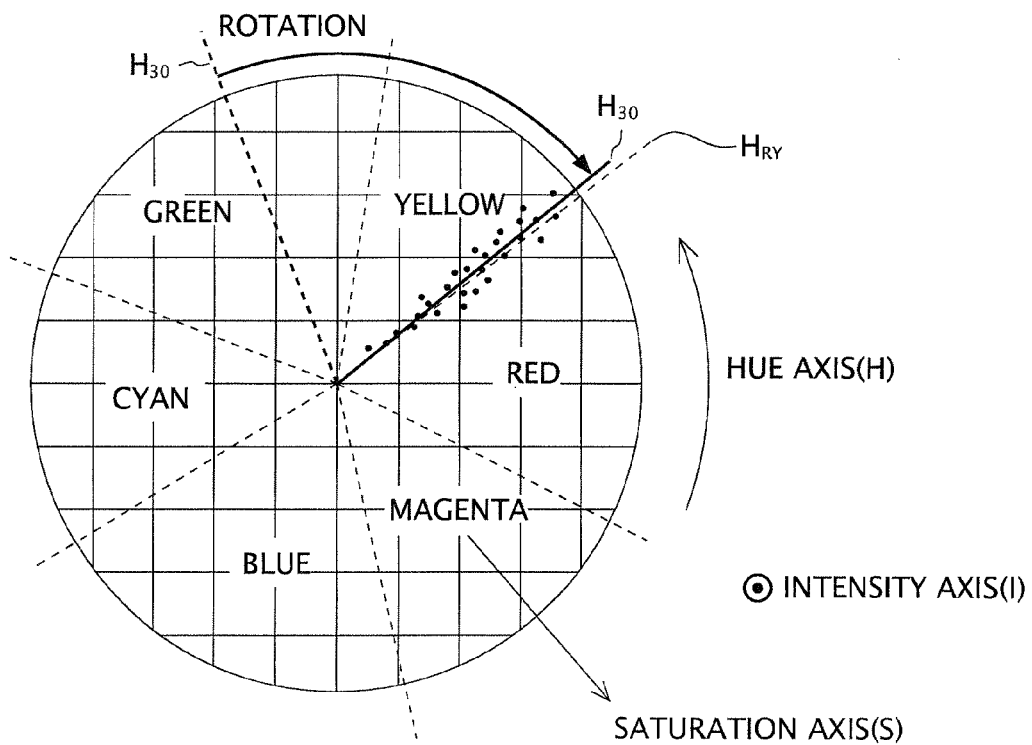
FIG. 7 is a diagram for illustrating rotation of the hue $H_{30}$.

In FIG. 7, an example is shown, in which the hue of each pixel is changed by rotating the hue $H_{30}$ so that it overlaps the boundary value between the red area and the yellow area (that is, the color boundary $H_{RY}$). In this case, the hue of each pixel is changed in accordance with the difference between the hue $H_{30}$ and the color boundary $H_{RY}$ (the angular difference in the direction of the hue axis (H)).

By changing the hue as described above, the plot positions of the values (hue/saturation/intensity) of each pixel in the color space are distributed near the boundary value between red and yellow (color boundary $H_{RY}$). Because of this, it is possible to produce a color image (real image) in which the color difference of each kind of cell is clear by finding each color component of red, green, and blue (RGB) of each pixel based on the values (hue/saturation/intensity) of each pixel after the hue has been changed.

Figure 8:
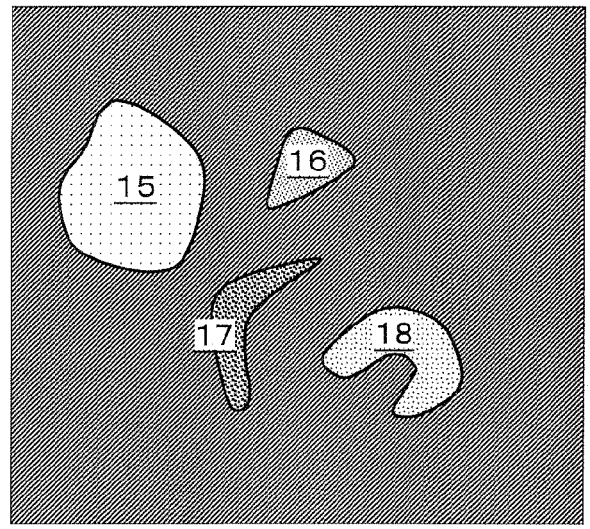
FIG. 8 is a schematic diagram of a color image after its hue has been changed.

The schematic diagram of the color image after the hue has been changed is illustrated in FIG. 8. In FIG. 8, the cells 15 to 18 are differently hatched in order to explicitly indicate that the color difference for each kind of cell has been clarified.

The image processing device 12 in the present embodiment carries out the processing in steps S6 to S9 (block 24) and the processing in steps S10 to S15 (block 25) following the processing in step S5 in order to further clarify the color difference in the color image (real image).

Figure 9:
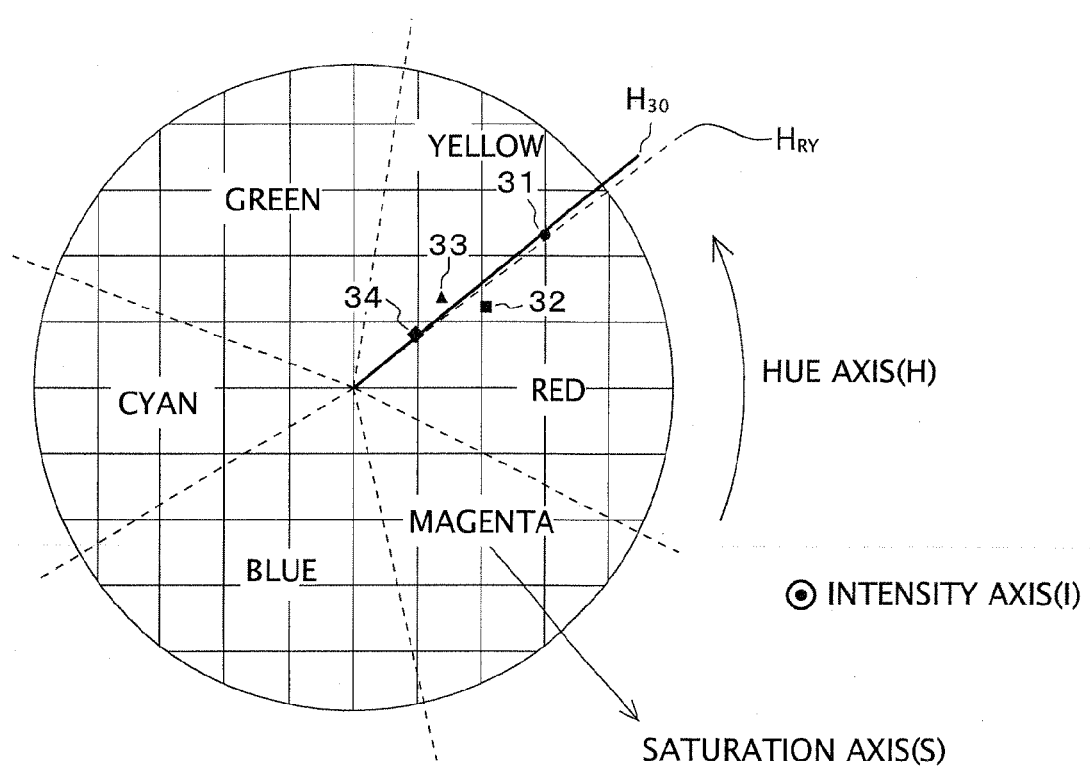
FIG. 9 is a diagram for illustrating extraction of target pixels 31 to 34.

First, in step S5, among the values (hue/saturation/intensity) of each pixel plotted in the color space (FIG. 7), the value of the hue $H_{30}$ or the value in the vicinity thereof is shown on the hue axis (H) and a plurality of target pixels 31 to 34 (refer to FIG. 9) indicative of different values from one another are extracted as samples on the saturation axis (S).

The samples (the plurality of the target pixels 31 to 34 of different saturations) may be extracted based on a user instruction through the input device 13 (FIG. 1A), or may be extracted automatically within the image processing device 12. When the samples are extracted based on a user instruction through the input device 13, it is preferable to display the image in the color space (FIG. 7) on the display device 14.

Figure 10:
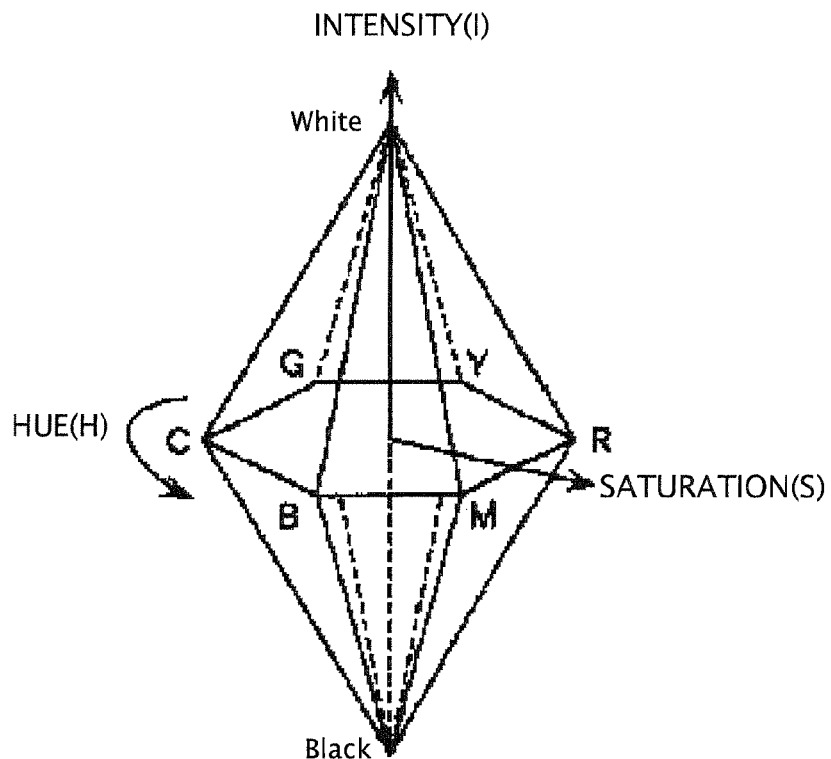
FIG. 10 is a diagram for illustrating a color space of a twin six-sided pyramid model.

In the next steps S6 to S9 (block 24), the saturation/intensity of each pixel are changed so that the target pixels 31 to 34 become most distant from one another in the three-dimensional color space (for example, the color space of a twin six-sided pyramid model shown in FIG. 10) using the values (hue/saturation/intensity) of the target pixels 31 to 34 extracted in step S5.

Specifically, distances (sample distances) between the plurality of the target pixels 31 to 34 in the color space (FIG. 10) are calculated and the same calculation is repeated while maintaining the parameter of the hue of each pixel constant and changing the parameters of the saturation/intensity. Then, when the parameters of the saturation/intensity with which the sample distance is maximum are found, the saturation and the intensity of each pixel of the entire image are changed using the parameters and the processing in steps S6 to S9 (block 24) is ended.

Figure 11:
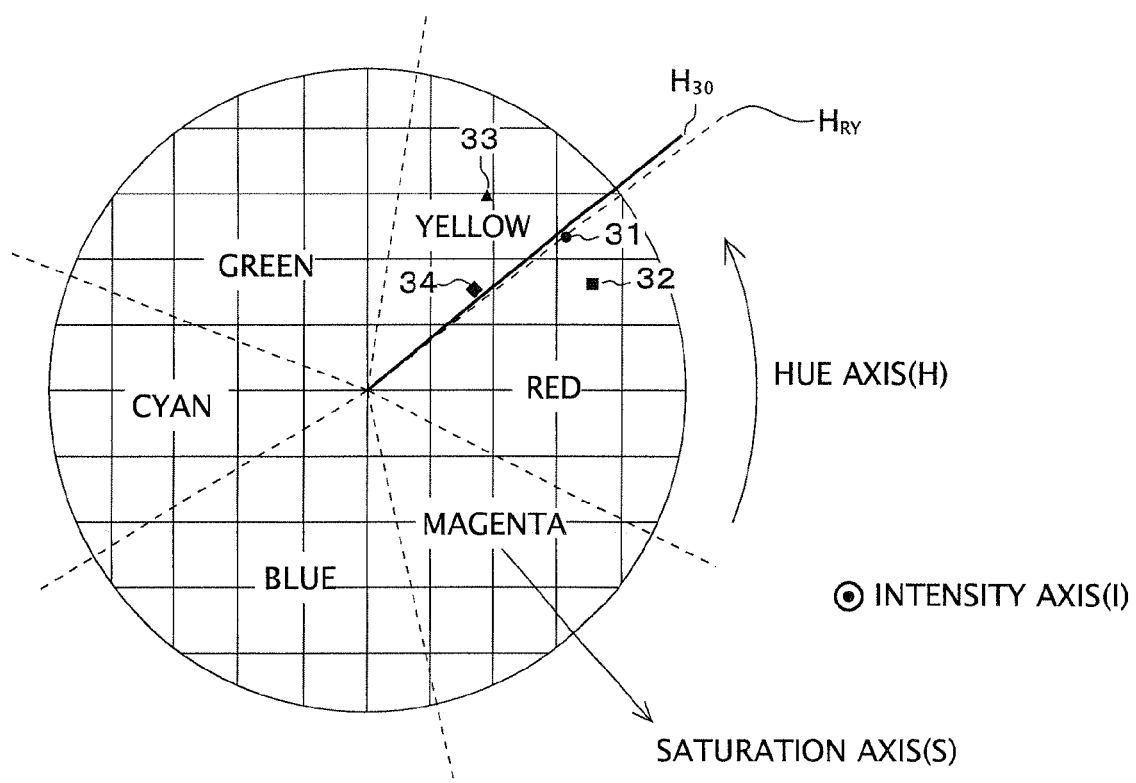
FIG. 11 is a diagram for illustrating plot positions of the target pixels 31 to 34 after their saturation/intensity have been changed.

The plot positions of the target pixels 31 to 34 at this point of time are shown in FIG. 11. As can be seen from the comparison with the plot positions (FIG. 9) before the saturation/intensity are changed, the plot positions after the change (FIG. 11) are distributed in a comparatively wide range on both sides with the boundary value (color boundary $H_{RY}$) between red and yellow sandwiched in between. The plot positions of other pixels, which are not shown, are distributed in a similar range.

Since the larger the distance in the color space, the larger the color difference in the real image, it is possible to produce a color image (real image) in which the color difference for each kind of cell is more clarified than the color image after the hue is changed (FIG. 8) by finding each color component of red, green and blue (RGB) of each pixel based on the values (hue/saturation/intensity) of each pixel after the saturation/intensity are changed.

In the next steps S10 to S15 (block 25), the processing in steps S12 to S14 is carried out in the middle of the repetition of the sample distance calculation similar to that in the above steps S6 to S9 (block 24).

In step S12, RGB conversion is carried out as pre-processing of step S13. That is, each color component of red, green and blue (RGB) of the respective target pixels 31 to 34 is found based on the values of the target pixels 31 to 34 after the hue/saturation/intensity are changed.

Figure 12:
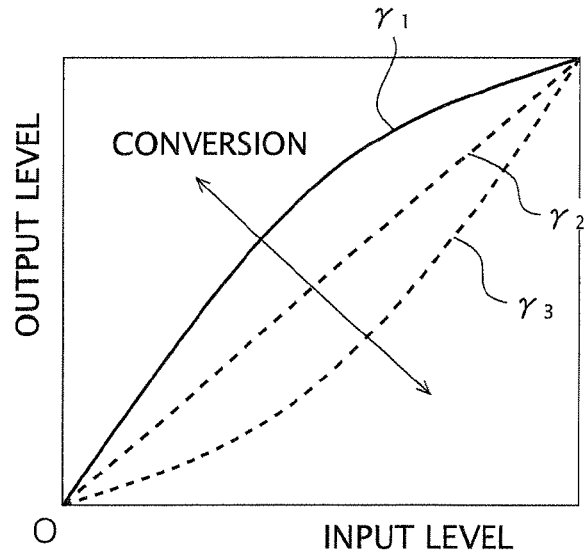
FIG. 12 is a diagram for illustrating an example of a gradation conversion curve ($\gamma_1$ to $\gamma_3$).

In step S13, gamma table conversion is carried out for each color component of red, green and blue (RGB) of the respective target pixels 31 to 34. That is, the data of the gradation conversion table corresponding to the gradation conversion curve (for example, any of the curves $\gamma_1$ to $\gamma_3$ in FIG. 12) of a predefined gamma value is read and the gradation of each color component of red, green and blue (RGB) is converted using the table. It is preferable to use a different table for each color component at this time.

In step S14, HSI conversion is carried out as post-processing of step S13. That is, the hue/saturation/intensity of the respective target pixels 31 to 34 are found based on each color component of red, green and blue (RGB) of the target pixels 31 to 34 after the gradation conversion. The hue/saturation/intensity of the respective target pixels 31 to 34 are used for the calculation of the sample distance in step S10.

Such processing in steps S12 to S14 is carried out repeatedly while changing the gamma value of the gradation conversion curve (FIG. 12) so that the target pixels 31 to 34 become most distant from one another in the color space (for example, FIG. 10). Then, when the gamma value with which the sample distance is maximum is found, the operation proceeds to the processing in the next step S15.

In step S15, the RGB conversion of the entire image is carried out first and then each color component of red, green and blue (RGB) of each pixel of the entire image is found. Then, the gamma table conversion is carried out for each color component of red, green and blue (RGB) of each pixel of the entire image. That is, the gradation of each color component of red, green and blue (RGB) is converted using the gradation conversion table of a gamma value with which the above sample distance is maximum. With this operation, the processing in steps S10 to S15 (block 25) is ended.

After the processing in step S15 is ended, the image processing device 12 in the present embodiment produces a color image (real image) of the specimen 10A based on each color component of red, green and blue (RGB) after the gradation conversion and outputs it, for example, to the display device 14 (FIG. 1A) as a final result.

Figure 13:
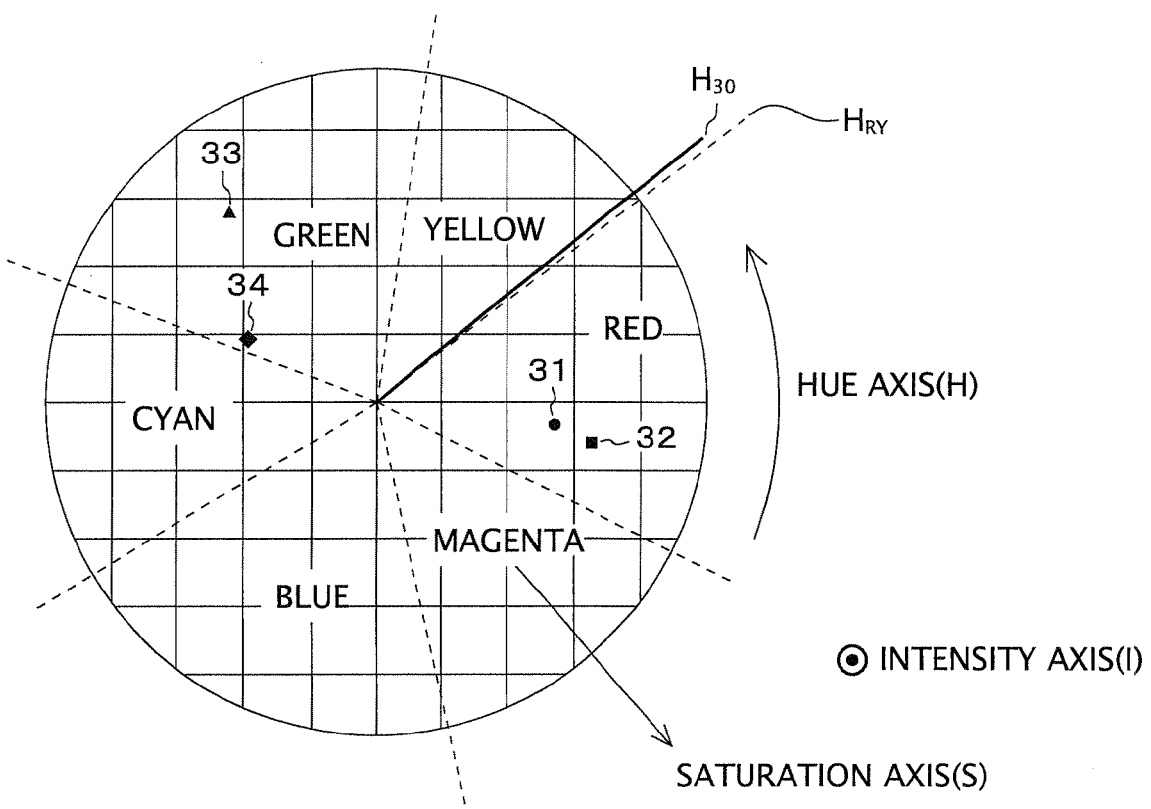
FIG. 13 is a diagram for illustrating the plot positions of the target pixels 31 to 34 when a sample distance has become maximum by the gradation conversion.

Here, the plot positions of the target pixels 31 to 34 when the sample distance is maximum in the processing in the above steps S10 to S15 (block 25) are shown in FIG. 13. As can be seen from the comparison with the previous plot positions (FIG. 9, FIG. 11), the plot positions in FIG. 13 are distributed in a very wide range on both sides with the boundary value (color boundary $H_{RY}$) between red and yellow sandwiched in between. The plot positions of other pixels, which are not shown, are also distributed in a similar range.

As already described, because the larger the distance in the color space, the larger the color difference in the real image, it is possible to obtain a color image (real image) in which the color difference for each kind of cell is more clarified than the color image after the hue is changed (FIG. 8) or the color image after the saturation/intensity are changed by producing a color image (real image) in step S15 based on the values (hue/saturation/intensity) of each pixel at the plot positions such as those in FIG. 13.

The image processing device 12 in the present embodiment takes in the color image of the specimen 10A and rotates the hue $H_{30}$ (FIG. 7) so that the mode value of the hue of each pixel (the hue $H_{30}$ in FIG. 6) overlaps one color boundary (for example, the color boundary $H_{RY}$) in the color space after subjecting it to negative-position reversal (FIG. 4) and changes the hue of each pixel of the entire image, and therefore, it is possible to clarify the slight color difference in the color image (real image) of the specimen 10A.

Consequently, the blood cells having substantially the same color when input are classified into each kind according to color and it is made possible to directly distinguish the color difference for each kind of cell in the color image (real image) of the specimen 10A and to diagnose the specimen 10A by color difference (to specify the individual kinds of cells).

In the diagnosis by the color difference, the standards for judgment are easy-to-see compared to the diagnosis by the difference in cell shapes. Because of this, it is possible for a person having no special knowledge about the cell shapes to make a diagnosis with ease. Further, the time required for the diagnosis can be shortened compared to the diagnosis by difference in cell shapes, and the variations in results due to the difference in skill and experience of a person who makes a diagnosis can also be reduced. In addition, it is easy to apply it to an automatic judgment using a computer.

Further, the diagnosis by the difference in cell shapes requires a magnification of about, for example, 1,000 (eyepiece 10× objective 100) of the image of specimen, and therefore, it is necessary to establish a liquid immersion state between the objective lens (not shown) and the specimen 10A and the labor and time used to be required to take in the color image of the specimen 10A. However, in the present embodiment, the diagnosis is made by the color difference, and therefore, detailed information about the cell shapes is not necessary. As a result, the magnification of the specimen image can be reduced (for example, about ×400) and the liquid immersion state between the objective lens and the specimen 10A is no longer necessary. Because of this, it is possible to take in the color image of the specimen 10A both easily and quickly.

The image processing device 12 in the present embodiment also changes the saturation and the intensity of each pixel of the entire image so that the sample distance between the target pixels 31 to 34 in the color space (FIG. 10) is maximum (FIG. 9 to FIG. 11), in addition to the change of the hue of each pixel of the entire image. Consequently, it is possible to further clarify the slight color difference in the color image (real image) of the specimen 10A.

Further, the image processing device 12 in the present embodiment converts the gradation of each color component of red, green and blue (RGB) of the entire image so that the sample distance between the target pixels 31 to 34 in the color space (FIG. 10) is maximum (FIG. 11 to FIG. 13), in addition to the change of the hue/saturation/intensity of each pixel of the above-mentioned entire image. Consequently, it is possible to further clarify the slight color difference in the color image (real image) of the specimen 10A.

The image processing device 12 in the present embodiment uses the gradation conversion table corresponding to the gradation conversion curve (for example, any of the curves $\gamma_1$ to $\gamma_3$ in FIG. 12) when converting the gradation of each color component of red, green and blue (RGB) of each pixel, and therefore, the processing of the gradation conversion can be carried out quickly. However, the gradation conversion may be carried out by the operation processing without using the table.

Further, the image processing device 12 in the present embodiment carries out the processing, such as changing of the hue, using the color image after negative-positive reversal (FIG. 4), and therefore, it is possible to obtain a visual field of familiar colors similar to the period of time of dark field observation of the specimen 10A. However, the processing, such as the similar changing of the hue, may be carried out using the color image before negative-positive reversal.

Description of Second Embodiment

In a second embodiment, an example will be described, in which the specimen 10A is a bone marrow specimen including Giemsa-stained eosinophils. A color image (real image) output from the imaging device 11 to the image processing device 12 is a photographed image of eosinophils. Then, the same processing (FIG. 2) as in the first embodiment is carried out for the color image.

Figure 14A:
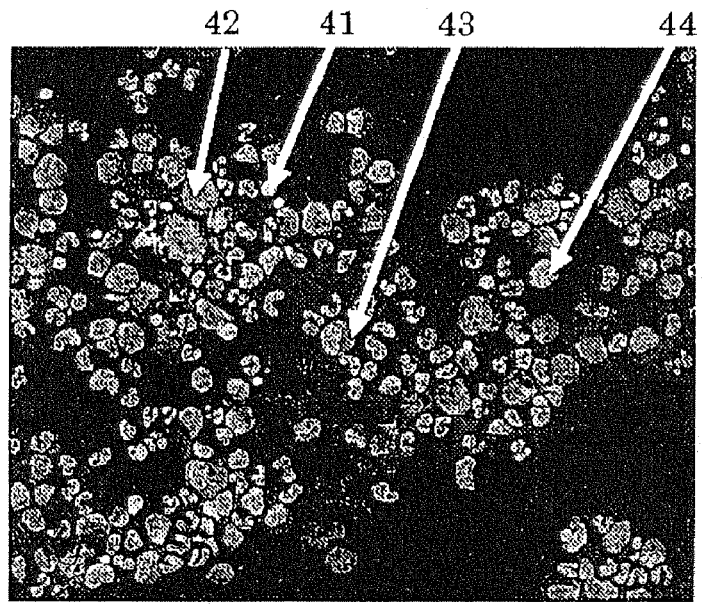
FIG. 14A is a diagram showing a color image after having been subjected to the negative-positive reversal of a specimen of bone marrow including Giemsa-stained eosinophils and FIG. 14B is a diagram showing a color image after having been subjected to the processing in FIG. 2.

In the color image after negative-positive reversal (FIG. 14A), the background is black and many green cells are distributed therein. The many cells include eosinophils, however, they are the same green as that of other cells and the color difference between the kinds of cell is extremely slight. Because of this, it is difficult to explicitly distinguish the color difference for each kind of cell in the color image (FIG. 14A).

Figure 14B:
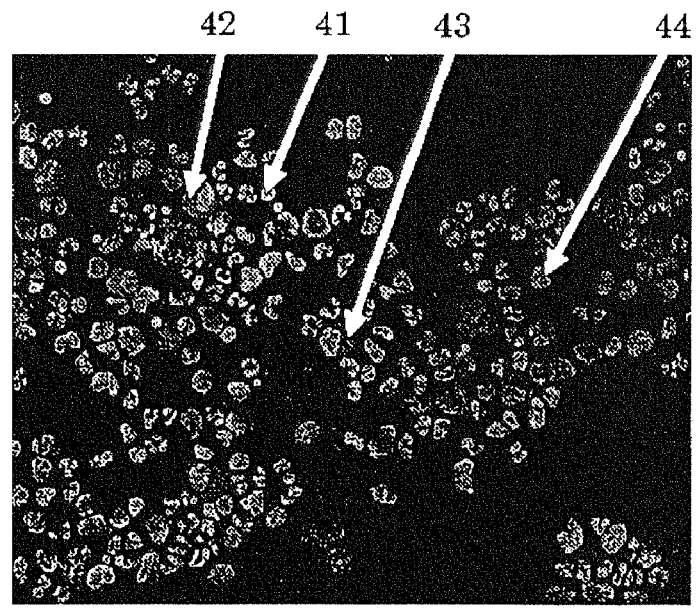

On the other hand, in the color image (FIG. 14B) after having been subjected to the processing in FIG. 2, cells of various colors are distributed in the black background, as a result. For example, a cell 41 assumes pink, cells 42, 43 assume green, and a cell 44 assumes red. Among these, it is known that the cells 42, 43 that remain unchanged, that is, green, correspond to eosinophils and the cells 41 44 that have changed from green to other colors correspond to leukocytes. Because of this, in the color image after the processing (FIG. 14B), it is possible to identify that the part the cytoplasm of which is green is eosinophils.

According to the second embodiment, when a bone marrow specimen including Giemsa-stained eosinophils is an object of the pathological diagnosis, it is possible to directly distinguish eosinophils from other leukocytes by the color difference in the color image (FIG. 14B) having been subjected to the processing in FIG. 2. Because of this it is possible to make a diagnosis based on the easy-to-see standards of judgment, that is, the color difference for each kind of cell.

At the time of diagnosis, it is preferable to select a target area with a predefined color value (for example, a green area corresponding to eosinophils) in the color image (FIG. 14B) after having been subjected to the processing in FIG. 2 to use it for the pathological judgment. The color value includes a value of each color component of red, green and blue (RGB) or values of hue/saturation/intensity of each pixel. By selecting a target area with the same color value, the pathological judgment is made easier.

The selection of a target area may also be carried out automatically within the image processing device 12 or based on a user instruction from the input device 13 (FIG. 1A). The selection based on the user instruction may be carried out based on, for example, a color value at a portion on the screen of the display device 14 at which a user clicks. It is preferable to display the selected target area so that is can be distinguished from other parts.

Further, at the time of diagnosis, it is preferable to measure the number or area ratio of target areas in the color image (FIG. 14B) after having been subjected to the processing in FIG. 2. When counting the number of target areas, it is preferable to detect a closed area with a predetermined color value as individual target areas by detecting already known edges (detection of contours) as its pre-processing.

The number of target areas is the number of those in the entire color image (FIG. 14B) or the number of those in a partial area. The area ratio of the target areas is the ratio of the number of pixels in the target area to the number of pixels of the entire color image (FIG. 14B), or the ratio of the number of pixels in the target areas to the number of pixels in the cell area in the image, and so on. By making such measurements, the pathological judgment is made easier.

In the above-described embodiments, the change of the saturation/intensity (S6 to S9) and the gradation conversion (S10 to 15) are carried out after the change of the hue (S3, S4), however, the present invention is not limited to those. Either of the change of the saturation/intensity (S6 to S9) and the gradation conversion (S10 to S15) may be omitted. When the gradation conversion (S10 to S15) is omitted, it is required to carry out the processing of RGB conversion after step S9. When both of the change of the saturation/intensity (S6 to S9) and the gradation conversion (S10 to S15) are omitted, the processing in step S5 is no longer necessary and it is required to carry out the processing of RGB conversion after the processing in step S4. When the change of the saturation/intensity (S6 to S9) is omitted, it is possible to apply a color space of a single six-sided pyramid model or cylindrical model, in addition to the color space of twin six-sided pyramid model (FIG. 10).

In the above-described embodiments, an example is described, in which the color image input to the image processing device 12 is an RGB image, however, the present invention is not limited to this. The present invention can be applied also when the color image is a YCbCr image. In this case, after the YCbCr image is converted into an RGB image, the processing in FIG. 2 is initiated.

In the above-described embodiments, the slight color difference in the color image is clarified by changing the hue of each pixel after finding the hue of each pixel of the color image, however, this does not necessarily need to be limited but it is also possible to find saturation from each color pixel of the color image, instead of hue, and change the saturation of each pixel. Hereinafter, a case, referred to as a third embodiment, is explained, where a slight color difference in a color image is clarified by changing saturation of each pixel of the color image. The configuration of an inspection apparatus used in this case is the same as the configuration in the first embodiment, and therefore, its explanation is omitted here and the same symbols are assigned in the following.

Description of Third Embodiment

In the third embodiment, the same image processing device 12 as that in the first embodiment is used. The third embodiment differs in that saturation shift processing is carried out in the image processing device in the first embodiment. The image processing device 12, for example, may be a computer in which an image processing program is installed. To install the image processing program, it is recommended to use a recording medium (CD-ROM etc.) in which the image processing program is recorded. Alternatively, it may also be possible to use carrier waves (including the image processing program) that can be downloaded via the Internet.

In the image processing device 12, the following processing (processing shown in FIG. 15) is executed.

Figure 15:
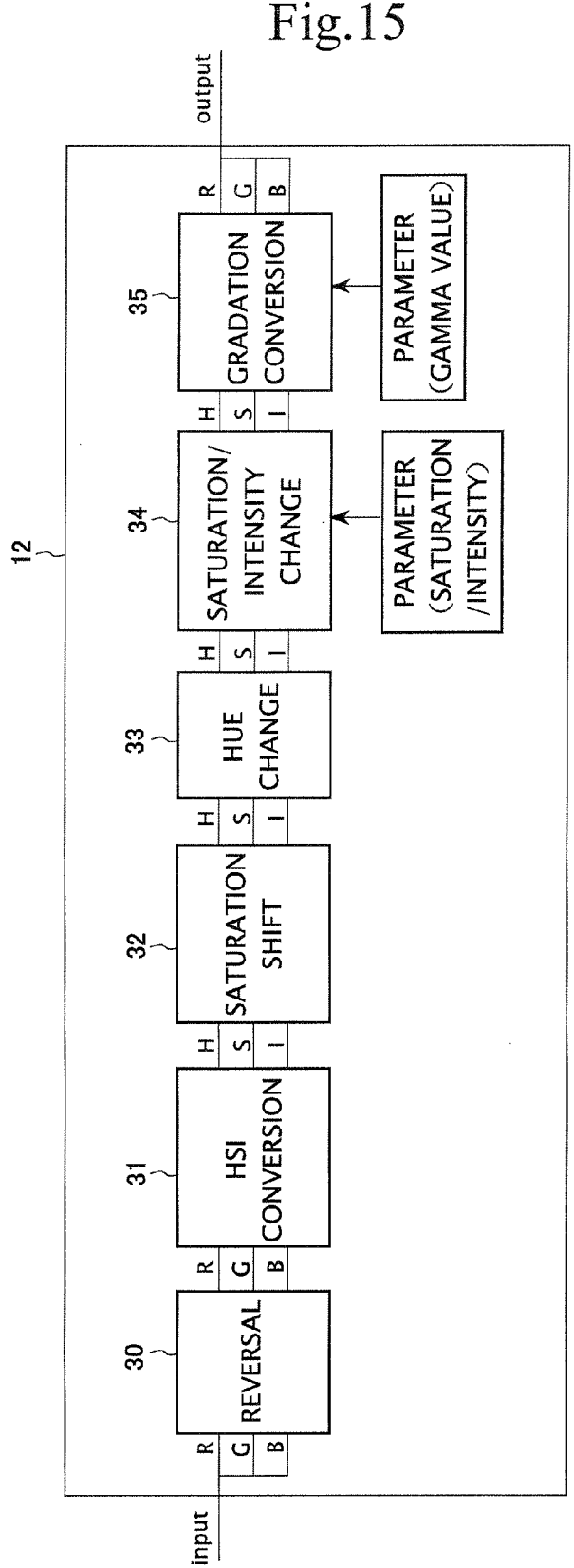
FIG. 15 is a diagram showing a modification example of a data path when processing a color image in a third embodiment.

1) Negative-positive reversal processing (block 50 in FIG. 15)
2) HSI conversion processing (block 51 in FIG. 15)
3) Saturation shift processing (block 52 in FIG. 15)

4) Hue change processing (block 53 in FIG. 15)

5) Saturation/intensity change processing (block 54 in FIG. 15)

6) Gradation conversion processing (block 55 in FIG. 15)

An image to be processed in the image processing device 12 may be a color image (RGB image) of a specimen.

1) Negative-Positive Reversal Processing

This is processing of negative-positive reversal of a color image of a specimen having been taken in. For example, as described in the first embodiment, in the color image before the reversal, purple cells are distributed in the white background and in the color image after the reversal, green cells are distributed in the black background. Because each image is a real image, the color difference for each kind of cell is extremely slight. Because of this, it is difficult to explicitly distinguish the color difference for each kind of cell on the real image.

2) HSI Conversion Processing

In the HSI conversion processing, based on each color component of red, green, and blue (RGB) of each pixel of the color image having been subjected to the negative-positive reversal processing, the hue (H), the saturation (S), and the intensity (I) of each pixel are found as color information of the pixel.

Figure 16:
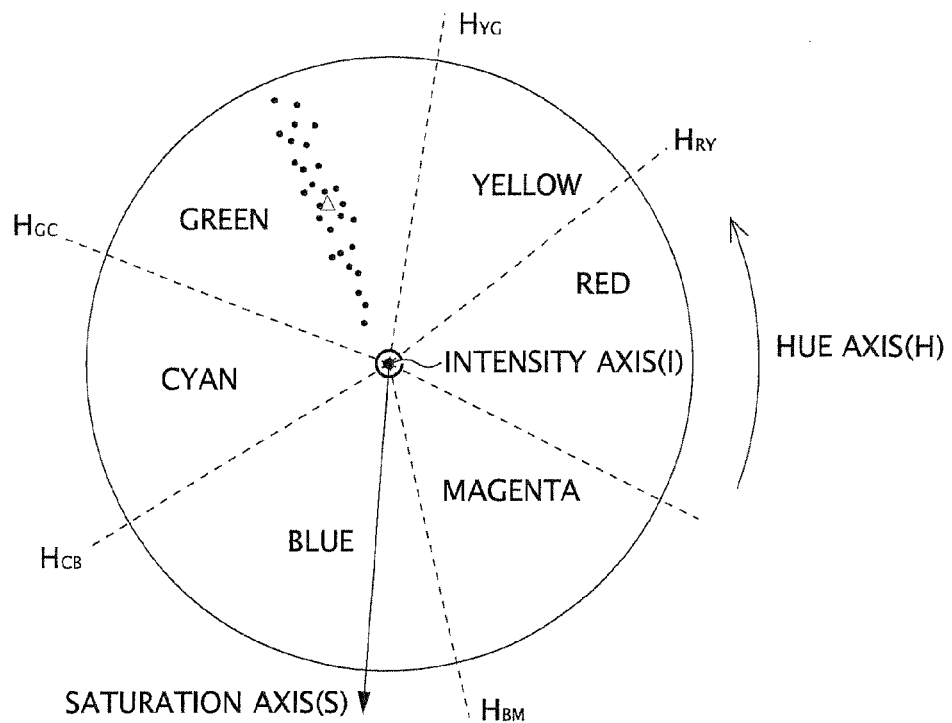
FIG. 16 is an explanatory diagram in which values (hue/saturation/intensity) of each pixel after having been subjected to HSI conversion are plotted in a predetermined color space.

The values (hue/saturation/intensity) of each pixel after the HSI conversion obtained as color information are plotted in a predetermined color space as, for example, "•" in FIG. 16. FIG. 16 shows a color space in which the circumferential direction in the plane of the paper denotes the hue axis (H), the radial direction denotes the saturation axis (S), and the direction perpendicular to the plane of the paper denotes the intensity axis (I). It can be seen that the plot positions of the values (hue/saturation/intensity) of each pixel are distributed near the center in the direction of the hue axis (H) in the green area.

3) Saturation Shift Processing

This is processing of shifting the value of saturation among the values (hue/saturation/intensity) of each pixel obtained by the HSI conversion by a predetermined amount. For example, by plotting the values of each pixel in the above-described color space, the hue distribution of each pixel is obtained, and therefore, the center of hue distribution (Δ shown in FIG. 16) is found. Then, the value of saturation of each pixel is shifted so that the center of hue distribution coincides with the intensity axis. By shifting the value of saturation, the values of hue, intensity, etc., that is, color information of each pixel, are converted. In the saturation shift processing, it is not necessarily required to shift so that the center of hue distribution of each pixel coincides with the intensity axis but it may also be possible to shift the saturation so that the number of the hues of each pixel increases.

4) Hue Change Processing

This is processing of changing the hue of each pixel the saturation of which has been shifted. The content of changing the hue of each pixel is that after the mode value of the hue that is most densely distributed is detected in the hue distribution after the saturation has been shifted, the hue is rotated so that the hue overlaps one of color boundaries (for example, anyone of color boundaries $H_{RY}$, $H_{YG}$, $H_{GC}$, $H_{CB}$, $H_{BM}$, and $H_{MR}$) and thus the hue of each pixel of the entire image is changed. A color boundary is a boundary value between two predefined hues.

Figure 17:
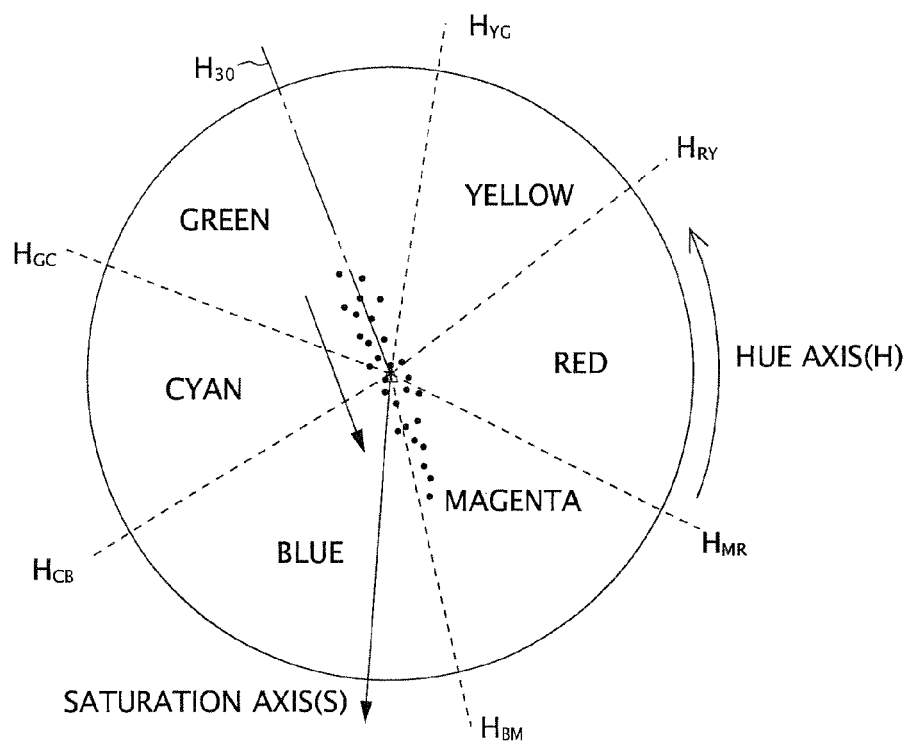
FIG. 17 is an explanatory diagram in which the saturation has been subjected to shift processing among the values of each pixel plotted in a color space.
Figure 18:
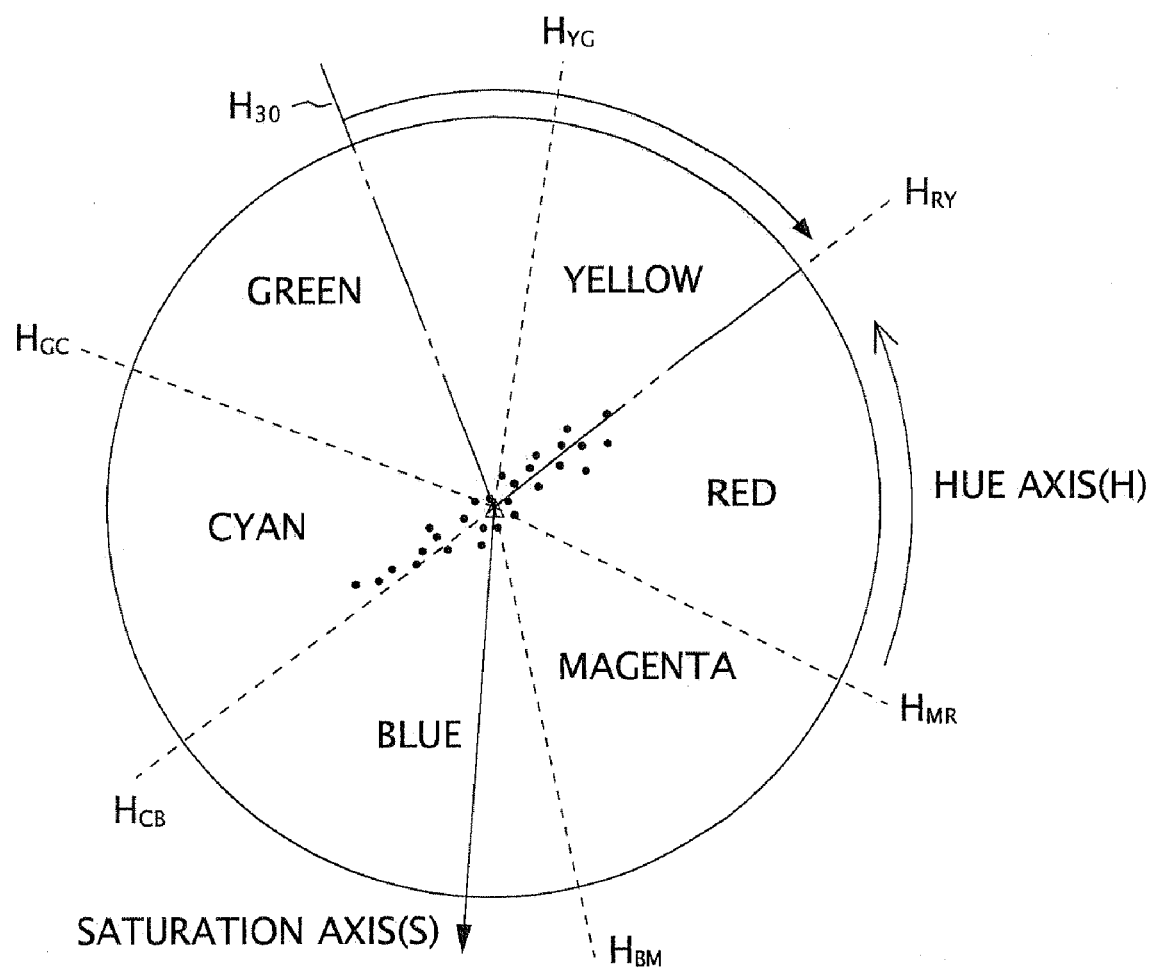
FIG. 18 is an explanatory diagram of the rotation of a hue $H_{30}$ after the saturation has been shifted.

As shown in FIG. 17, when the hue that is most densely distributed is green, the mode value is $H30$. In this case, as shown in FIG. 18, an example is shown, in which the hue of each pixel is changed by rotating the hue $H_{30}$ so that it overlaps the boundary value between the red area and the yellow area (that is, the color boundary $H_{RY}$). In this case, the hue of each pixel is changed in accordance with the difference between the hue $H_{30}$ and the color boundary $H_{RY}$ (the angular difference in the direction of the hue axis (H)). By changing the hue in this manner, the hue distribution of each pixel in the color space is converted and a state where the plot positions of each pixel are distributed in many colors is brought about.

After the hue is changed, by finding each color component of red, green, and blue (RGB) of each pixel based on the values (hue/saturation/intensity) of each pixel, it is possible to produce a color image (real image) in which the color difference for each kind of cell is clear.

5) Saturation/Intensity Change Processing

In order to further clarify the color difference in the color image (real image), the saturation/intensity change processing is carried out. In this saturation/intensity change processing, among the values (hue/saturation/intensity) of each pixel plotted in the color space, a plurality of target pixels indicative of different values from one another is extracted as samples and the saturation/intensity of each pixel are changed so that the target pixels extracted as samples become most distant from one another in the three-dimensional color space.

Specifically, distances (sample distances) between the plurality of target pixels in the color space described above are calculated and the same calculation is repeated while maintaining the parameter of the hue of each pixel constant and changing the parameters of the saturation/intensity. Then, when the parameters of the saturation/intensity with which the sample distance is maximum are found, the saturation and the intensity of each pixel of the entire image are changed using the parameters.

6) Gradation Conversion Processing

The gradation conversion processing is, for example, processing of converting the values (hue/saturation/intensity) of the target pixel the saturation/intensity of which have been changed into each color component of red, green, and blue (RGB) and carrying out gamma table conversion for each converted color component of red, green, and blue (RGB). That is, the data of the gradation conversion table corresponding to the gradation conversion curve of a predefined gamma value is read and the gradation of each color component of red, green, and blue (RGB) is converted using the table. As the distance between the target pixels becomes longer, the color difference in the real image becomes larger, and therefore, a gamma value with which the target pixels become most distant from one another is found and then the gradation of each color component of red, green, and blue (RGB) of each pixel is converted using the gradation conversion table of the gamma value. Then, the color image (real image) of the specimen having been subjected to the gradation conversion processing is output to the display device 14 as a final result.

Figure 19:
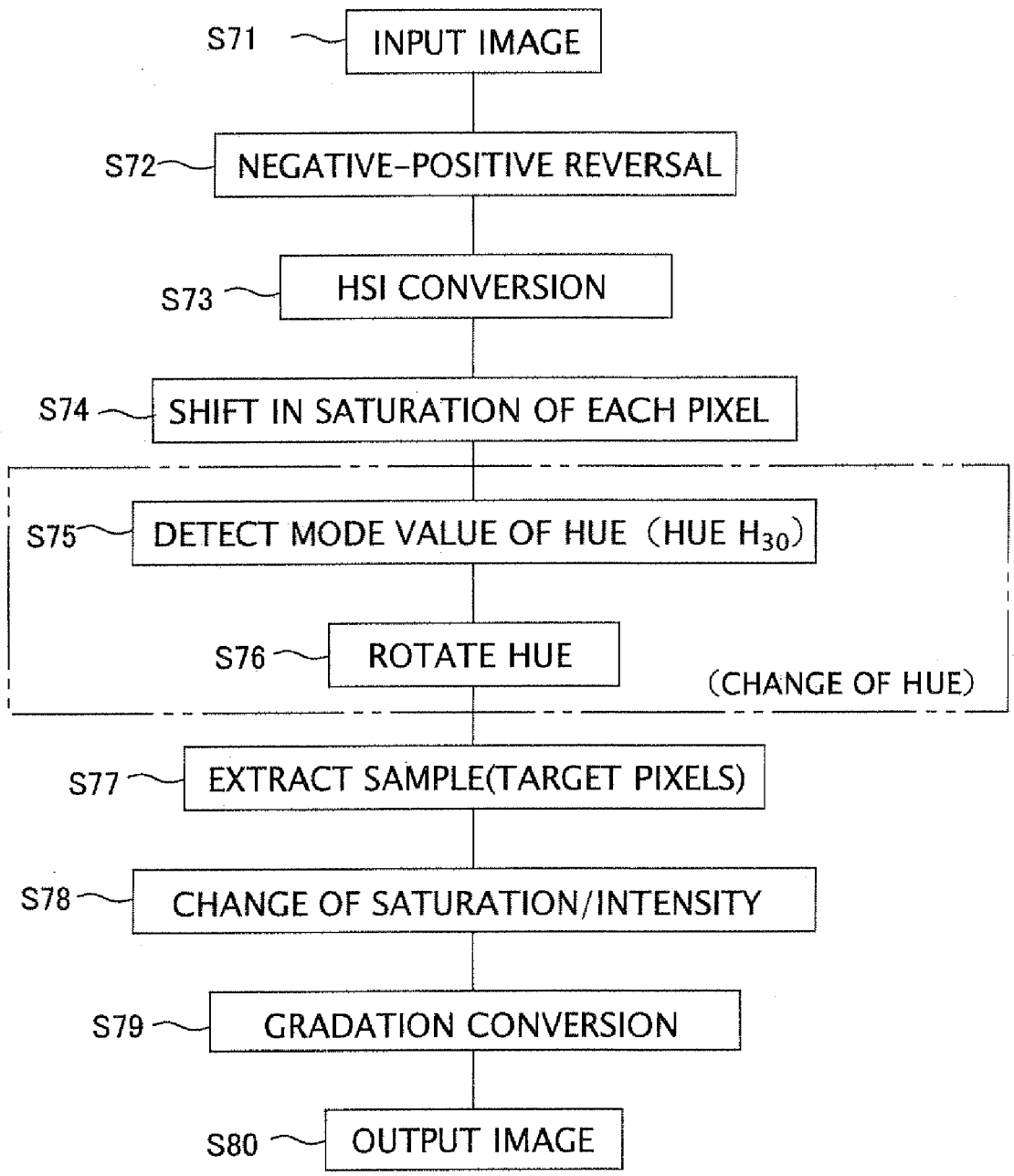
FIG. 19 is a flowchart showing a processing operation of a color image in an image processing device in an embodiment.

Next, the flow of image processing is explained based on the flowchart shown in FIG. 19.

Step S71 is processing of taking in the color image of a specimen, that is, image input processing. When the image input processing in this step S71 is completed, image processing shown in steps S72 to S79 is carried out.

Step S72 is processing of negative-positive reversal of an input color image. After the processing of the input color image is carried out, the operation proceeds to step S73.

Step S73 is HSI conversion processing. By the HSI processing, each color component of RGB of the color image having been subjected to the negative-positive conversion is converted into each component of HSI.

In step S74, each pixel is plotted at the coordinates in the above-described color space using the color information (hue, saturation, and intensity) of each pixel of the color image having been subjected to the HSI conversion. By plotting all of the pixels of the color image in the color space, the hue distribution of all of the pixels can be obtained. From this hue distribution, the center position is found and then the saturation of each pixel is shifted so that the center position coincides with the intensity axis.

For example, as shown in FIG. 16, when each pixel is plotted in the color space, if all of the pixels are distributed in the green range, the center position of the hue distribution is the position indicated by a mark Δ. By shifting the saturation of each pixel (in the direction of the arrow in FIG. 17) so that the center position coincides with the intensity axis, all of the pixels that have been distributed in the green area are distributed not only in the green area but also in the areas of other hues (refer to FIG. 17). When this step S74 is completed, the operation proceeds to the hue change processing (steps S75, S76).

Step S75 is processing to find the mode value of a hue. By carrying out the processing of step S74, for example, a hue in an area where the number of plotted values is largest in the hue distribution of all of the pixels distributed in each color area is detected as the mode value of the hue. In the case of FIG. 17, the number of distributed pixels is largest in the green area, and therefore, for example, $H_{30}$ is detected as the mode value of the hue in this case. After the mode value of the hue is detected, the operation proceeds to step S76.

Step S76 is processing to rotate the hue. In step S75, the mode value of the hue is detected as $H_{30}$, and therefore, the mode value $H_{30}$ of the hue is rotated so as to, for example, coincide with the color boundary $H_{RY}$ (refer to FIG. 18). By rotating the mode value $H_{30}$ of the hue, the hue of each pixel is changed.

After the processing of step S76 is completed, the operation proceeds to step S77, in which samples (target pixels) are extracted automatically or by user's selection.

Step S78 is saturation/intensity change processing. In this step S78, the saturation/intensity of each pixel are changed so that the target pixels extracted as samples become most distant from one another in the three-dimensional color space.

Step S79 is gradation conversion processing. In the gradation conversion processing, for example, the values (hue/saturation/intensity) of the target pixel the saturation/intensity of which have been changed are converted into each color component of red, green, and blue (RGB) and each converted color component of red, green, and blue (RGB) is subjected to the gamma table conversion. Then, a gamma value with which the distance between the target pixels is longest is found, and the gradation of each color (R, G, B) component of each pixel is converted using the gradation conversion table of the gamma value.

Step S80 is processing to output the color image having been subjected to the gradation conversion. When this step S80 is carried out, for example, the color image having been subjected to the gradation conversion is output to the display device 14. The color image output to the display device 14 will be a color image the color difference between cells has been clarified.

In this case, by changing the saturation of each pixel of the entire image using the image processing device 12, the hue is also changed, and therefore, it is possible to clarify the slight color difference in the color image (real image) of a specimen.

Consequently, the blood cells having substantially the same color when input are classified into each kind according to color and it is made possible to directly distinguish the color difference for each kind of cell in the color image (real image) of the specimen and to diagnose the specimen by color difference (to identify the individual kinds of cell).

Figure 20:
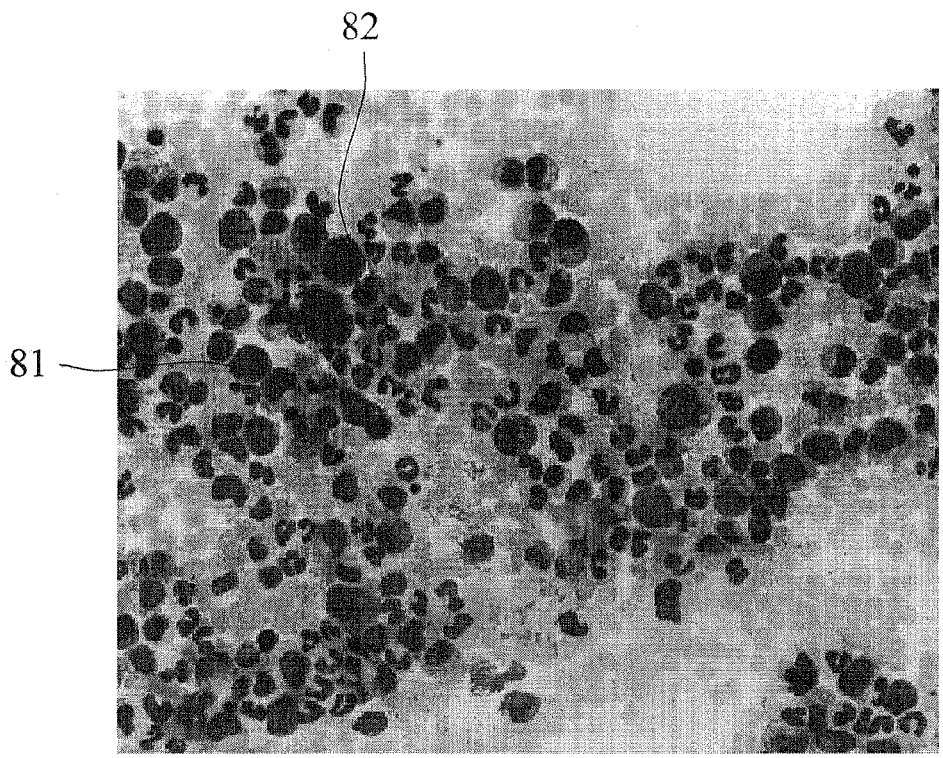
FIG. 20 is an explanatory diagram showing an example of a color image of a bone marrow specimen including Giemsa-stained eosinophil.

In the third embodiment also, the image processing device can be used when, for example, a specimen is a bone marrow specimen including Giemsa-stained eosinophil. As shown in FIG. 20, a color image (real image) output from the imaging device 11 to the image processing device 12 is a photographed image of a specimen, a bone marrow specimen. In the photographed color image of the specimen, it can be seen that many cells are distributed. The many cells include eosinophils, however, the cells of the eosinophils are the same color as that of other cells (for example, reddish purple, or bluish purple) and the color difference for each kind of cell is extremely slight. That is, it is difficult to explicitly distinguish the color difference for each kind of cell on the color image because cells 81, 82 are eosinophils, however, the color of the cells of eosinophils and the color of other cells are shown in a similar color (reddish purple, bluish purple, etc.).

Figure 21:
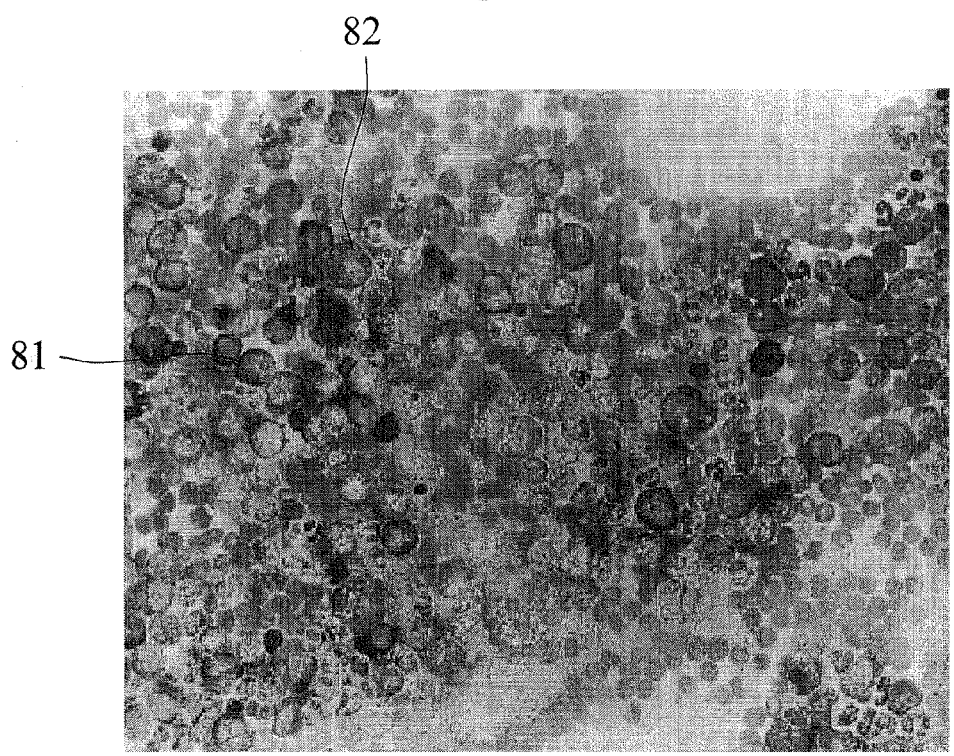
FIG. 21 is an explanatory diagram showing an example of a color image of a bone marrow specimen including Giemsa-stained eosinophil after having been subjected to the saturation shift processing and the hue conversion processing.

When the color image obtained by photographing such a specimen is subjected to the processing in steps S73 to S79 in FIG. 19, the color of the many cells described above changes into difference colors according to each kind of cell (refer to FIG. 21). For example, the color of the cytoplasm of the cells 81, 82, which are eosinophils, changes from bluish purple to green and the color of other cells changes into different colors (for example, pink) according to each kind of cell.

According to the above, when a bone marrow specimen including Giemsa-stained eosinophils is an object of the pathological diagnosis, it is possible to directly distinguish eosinophils from other cells by the color difference in the color image having been subjected to the image processing described above. Because of this, it is possible to make a diagnosis based on the easy-to-see standards of judgment, that is, the color difference for each kind of cell.

In the third embodiment, the saturation shift processing of each pixel is carried out after the HSI conversion processing, however, this is not limited, but it is also possible to carry out, for example, before the HSI conversion processing or after the hue conversion processing.

In the third embodiment, a color image is subjected to the negative-positive conversion processing, however, it is possible to disperse the hue of each pixel centralized to a specific hue into a plurality of hues by shifting the saturation, and therefore, it is not necessarily required to subject a color image to the negative-positive conversion processing.

In the third embodiment, the hue conversion processing is carried out after the saturation shift processing of each pixel is carried out, however, there is a case where the hue of each pixel is dispersed in the area of each hue by carrying out the saturation shift processing, and therefore, it is not necessarily required to carry out the hue conversion processing. That is, when detailed information about the shapes of cells is not necessary for the observation of a specimen, it is possible to easily make a diagnose by color difference only by carrying out the saturation shift processing and observe a specimen or take in a color image without the need to increase the magnification of the specimen image.

In the embodiment described above, an example is explained, in which the color image input to the image processing device 12 is an RGB image, however, the present invention is not limited to this. The present invention can also be applied when the color image is a YCbCr image. In this case, after the YCbCr image is converted into an RGB image, the processing of S72 to S79 shown in FIG. 19 is carried out.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device, comprising:
   a processing unit that determines color information including one of hue and saturation value of each pixel of a color image;
   a detecting unit that detects a mode value corresponding to positions of the determined hue values of the pixels; and
   a changing unit that changes the color information of each pixel by at least changing the determined hue value of each pixel of the color image in accordance with a difference between a boundary value of two predefined hues and the mode value.

2. The image processing device according to claim 1, wherein:
   the processing unit determines saturation and intensity of each pixel, in addition to the hue; and
   the changing unit also changes the saturation and the intensity, in addition to the change of the hue and changes the saturation and the intensity of each pixel of the color image so that a plurality of target pixels different in the saturation becomes most distant from one another in a color space including a hue axis, a saturation axis and an intensity axis.

3. The image processing device according to claim 2, further comprising,
   a converting unit which determines each color component of red, green and blue of each pixel of the color image based on the hue, the saturation and the intensity after the change by the changing unit and converts a gradation of the each color component so that the plurality of target pixels becomes most distant from one another in the color space.

4. The image processing device according to claim 1, wherein:
   the processing unit determines saturation and intensity of each pixel, in addition to the hue; and
   the device further comprises a converting unit which determines each color component of red, green and blue of each pixel in the color image based on the hue after the change by the changing unit and the saturation and the intensity determined by the processing unit and converts a gradation of the each color component so that a plurality of target pixels different in the saturation becomes most distant from one another in a color space including a hue axis, a saturation axis and an intensity axis.

5. The image processing device according to claim 3 or claim 4, wherein
   the converting unit converts the gradation of the each color component using a table.

6. The image processing device according to any one of claim 2 to 4, further comprising,
   an extracting unit that extracts the plurality of target pixels based on a user instruction.

7. The image processing device according to claim 1, further comprising,
   a selecting unit that selects a target area with a predefined color value in the color image.

8. The image processing device according to claim 7, wherein
   the selecting unit selects the target area based on the user instruction.

9. The image processing device according to claim 7, further comprising,
   a measuring unit that measures the number or area ratio of the target areas in the color image.

10. The imaging processing device according to claim 1, wherein the processing unit determines at least the hue of each pixel using the color image after having been subjected to negative-positive reversal.

11. The imaging processing device according to claim 1, wherein the color image is a photographed image of eosinophil.

12. A recording non-transitory computer-readable medium storing an image processing program, causing a computer to:
   determine color information including one of hue and saturation value of each pixel of a color image;
   detect a mode value corresponding to positions of the determined hue values of the pixels; and
   change the color information of each pixel by at least changing the determined hue value of each pixel of the color image in accordance with a difference between a boundary value of two predefined hues and the mode value.

* * * * *